Sept. 21, 1965 H. D. FLAGLE 3,207,842

FOUR CHANNEL VIDEO INTEGRATOR

Filed Nov. 16, 1962 3 Sheets-Sheet 1

INVENTOR

HARRY D. FLAGLE

FOUR CHANNEL VIDEO INTEGRATOR

Filed Nov. 16, 1962 3 Sheets-Sheet 2

INVENTOR

Harry D. Flagle

HARRY D. FLAGLE

FOUR CHANNEL VIDEO INTEGRATOR

INVENTOR
HARRY D. FLAGLE

United States Patent Office 3,207,842
Patented Sept. 21, 1965

3,207,842

FOUR CHANNEL VIDEO INTEGRATOR

Harry D. Flagle, Silver Spring, Md.
(143 E. Hillsdale Blvd., San Mateo, Calif.)

Filed Nov. 16, 1962, Ser. No. 238,080
9 Claims. (Cl. 178—6)

The present invention relates in general to video circuits and more particularly to a system for synchronizing the application of a plurality of video signals to a cathode ray tube.

Much activity in the field of closed circuit television is centered around its use as a means of remote monitoring of various activities, many of which are carried on simultaneously. These activities include traffic observation, both on the highways and at our airports, management control of employee activity, telemetering of missile control activity and numerous other activities. However, most of the equipment presently available for closed circuit television will permit the reception of but one video signal at a time on a single receiver. Other equipment, although permitting display of more than one video pattern, is so complex and expensive as to obviate its own intended use in most applications. Where simultaneous monitoring of a plurality of signals is required, a duplication of receiving equipment is the only practical answer provided by the prior art. This duplication, however, results in greatly increased costs, waste of valuable space, and seriously frustrates the monitoring process by requiring observation of widely scattered signals.

Special effects equipment is available on the commercial market for effecting the simultaneous display of more than one video picture on a single cathode ray tube; however, this equipment is limited to the control of but two pictures at a time and is available only at very high cost. The equipment may be multiplied to effect control of a greater number of pictures, but this also increases the basic cost of the equipment, which is many thousands of dollars, and increases the space required by the equipment, which is several cubic feet in volume to begin with.

The invention provides a simple, compact system for simultaneously displaying up to four video pictures on a single cathode ray tube. This system is very inexpensive compared to presently available models and has been much simplified through the elimination of the special effects amplifier which is considered to essential to present commercial systems. The system according to the invention makes possible display of up to four patterns at a time, pedestal level control, wipes, split-screens, special effects through external keying, inserts, and many other control techniques resulting in almost complete control over any combination of video patterns.

It is therefore an object of the present invention to provide a video control system for effecting simultaneous and distinct display of a plurality of video signals on a single cathode ray tube.

It is another object of the invention to provide a system for transforming a plurality of video signals into a composite signal so as to effect simultaneous display of distinct video patterns.

It is a further object of the invention to provide a system for synchronizing the application of a plurality of video signals to a cathode ray tube so as to effect simultaneous display of a plurality of distinct patterns, instantaneous selective switching between patterns on distinct portions of the cathode ray tube screen, and the insertion of a video pattern over a portion of a second pattern in regulatable amounts.

It is still another object of the present invention to provide a system of the type described which is very compact and inexpensive and which may be readily used with all types of existing video equipment.

These and other objects and many of attendant benefits of this invention will be readily appreciated as the same becomes better understood by reference to the following detailed description when considered in connection with the accompanying drawings, in which.

Figures 1, 2:
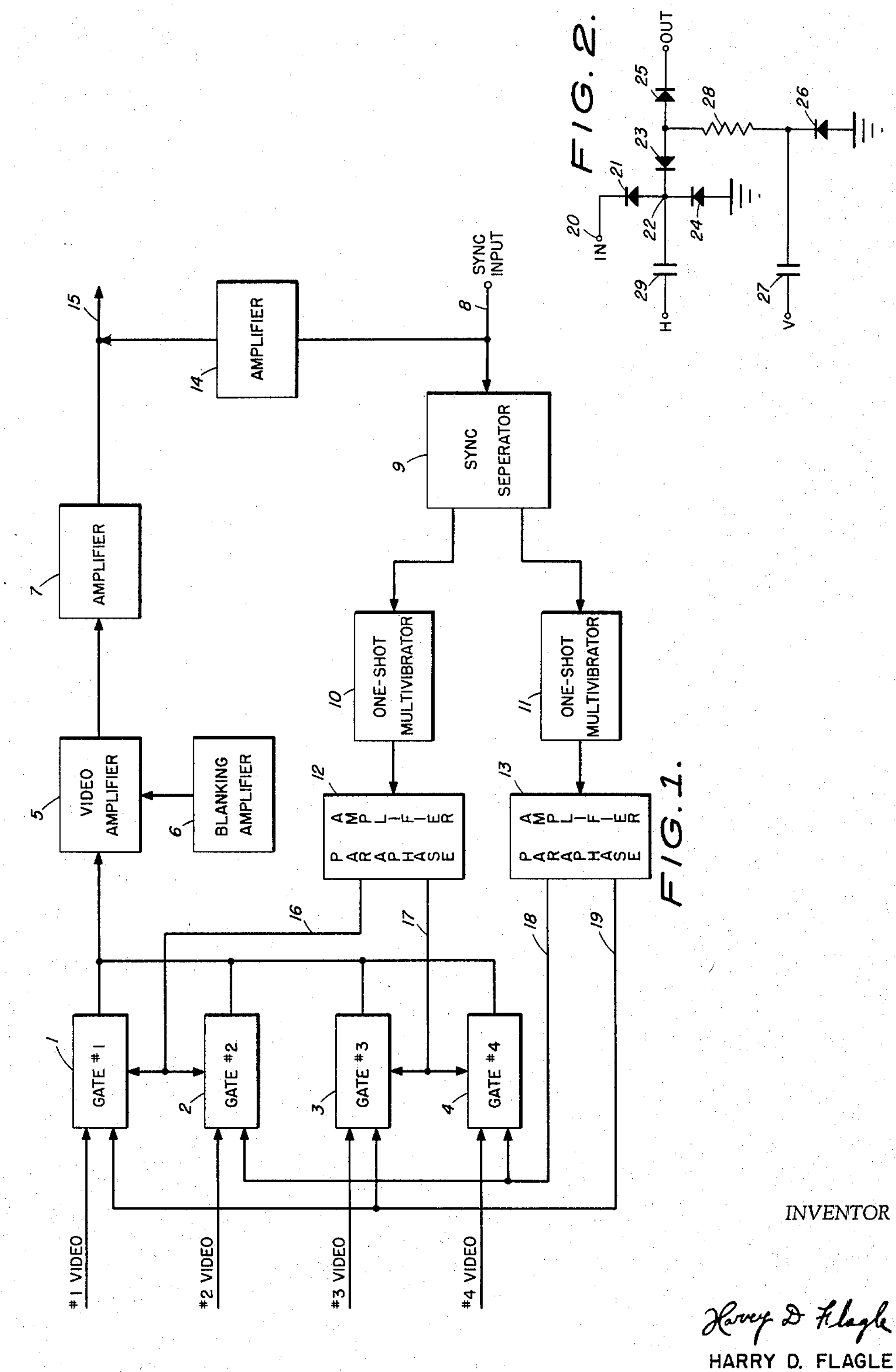
FIGURE 1 is a block diagram of one embodiment of the invention.
FIGURE 2 is a schematic diagram of a diode coincidence gate which forms part of the invention.

A block diagram of one embodiment of the invention is shown in FIG. 1. The system as shown is desgned to accept four separate video signals and to transform them into a composite signal for showing on a single cathode ray tube. The input video signals are applied to to diode concidence gates 1, 2, 3 and 4, respectively. Each gate is in turn controlled by the horizontal and vertical sync pulses applied thereto. This action will be discussed in more detail in conjunction with the description of FIG. 2. The output of each coincidence gate is connected to a video amplifier 5 which is controlled by a blanking amplifier 6 to provide for normal video blanking. The output of video amplifier 5 is in turn connected through amplifier 7 to the output 15 of the system.

Sync signals enter at sync input 8 and are applied to a conventional sync separator 9 where horizontal and vertical sync pulses are separated. The vertical pulses are then applied to a one-shot multivibrator 10 and the horizontal pulses are applied to a second one-shot multivibrator 11. The outputs of multivibrators 10 and 11 are applied to a pair of paraphase amplifiers 12 and 13, respectively. Paraphase amplifier 12, controlled by the one-shot multivibrator 10, produces a pair of phase inverted signals, one of which is applied to gates 1 and 2 and the other of which is applied to gates 3 and 4. In a like manner paraphase amplifier 13 is controlled by one-shot multivibrator 11 and produces a pair of phase inverted signals, one of which is applied to gates 1 and 3, respectively, and the other of which is applied to gates 2 and 4, respectively. These pulses from amplifiers 12 and 13 are used to control the operation of the gates 1, 2, 3 and 4. The sync input signals which enter at input 8 and are applied to sync separator 9 are also applied to an amplifier 14 and then combined with the composite video output signal at the output 15.

Looking more closely to the diode coincident gate shown in FIG. 2, the input 20 is connected by a diode 21 to a junction point 22. The junction point 22 connects leads from diode 21, diode 23, and a diode 24, which is in turn connected to ground. The other terminal of diode 23 is connected by a diode 25 to the output 29. The junction point between diodes 23 and 25 is connected via a resistor 28 to a diode 26 and thence to ground. Input horizontal sync pulses are applied at terminal H and then coupled via a capacitor 30 to the junction point 22. In a like manner, vertical sync pulses are applied at terminal V and then coupled via capacitor 27 to a junction point between resistor 28 and diode 26.

The polarity of diodes in this diode coincidence gate has been arranged so that the signal from input 20 will not pass through the gate to the output unless a positive pulse appears at the input for the horizontal sync pulses and also at the input for the vertical sync pulses. With no signal at either H or V, an input signal applied to input terminal 20 will pass via diode 21, junction point 22, and diode 24 to ground. This is so because the diodes 21 and 24 are poled in such a manner that they will pass the negative input video signal. In turn diodes 23 and 26 are poled in such a manner that they will pass the input video signal via resistor 28 to ground. Therefore, with no pulses at either H or V the input video signal will be grounded and will not pass on to the output.

If a positive sync pulse is applied at H diode 24 will be back-biased and will present a high impedance to any incoming signals. An incoming signal will then pass diode 21 and junction point 22 and will be applied to diode 23. However, since the input sync pulse at H is positive, diode 23 will be biased so as to present a high impedance to any incoming negative signals. The incoming video signal thus will be blocked at diode 23. In addition, diode 25 would present a high impedance to any incoming signals due to its polarity, and any incoming signal getting through diode 23 would be grounded through resistor 28 and diode 26 due to the polarity of diode 26.

If now a positive sync signal is applied at V the input signal will pass through diode 21, junction point 22, and will again be applied to diode 23. However, now the positive pulse at V will forward-bias diode 23 and back-bias diode 26 so that diode 23 will pass a negative input signal whereas diode 26 will present a high impedance to a negative input signal. The input signal will then pass through diode 23 and will be applied to diode 25. This diode, however, is also forward-biased by the positive sync signal at V and will pass the negative input video signal to the output. It is thus seen that the diode coincidence gate will pass the incoming video signal only when a positive sync pulse appears at both H and V. These pulses at H and V are derived, respectively, from paraphase amplifiers 13 and 12.

In operation of the invention, separate video signals are applied to the input gates 1, 2, 3 and 4, respectively. As already described in conjunction with FIG. 2 these video pulses are inhibited by the respective coincidence gate circuits unless a positive sync pulse is applied to the gate in coincidence from amplifiers 12 and 13. With four video signals applied to a single cathode ray tube each video image will occupy one-fourth of the cathode ray tube screen. This signal coordination is accomplished through proper timing of one-shot multivibrators 10 and 11. One-shot multivibrator 10 which receives vertical sync pulses from sync separator 9 is adjusted to conduct for one-half the standard vertical sweep time set by television standards. In a like manner one-shot multivibrator 11 which receives horizontal sync pulses from sync separator 9 is adjusted to conduct for one-half of the normal horizontal scan time.

Figure 3:
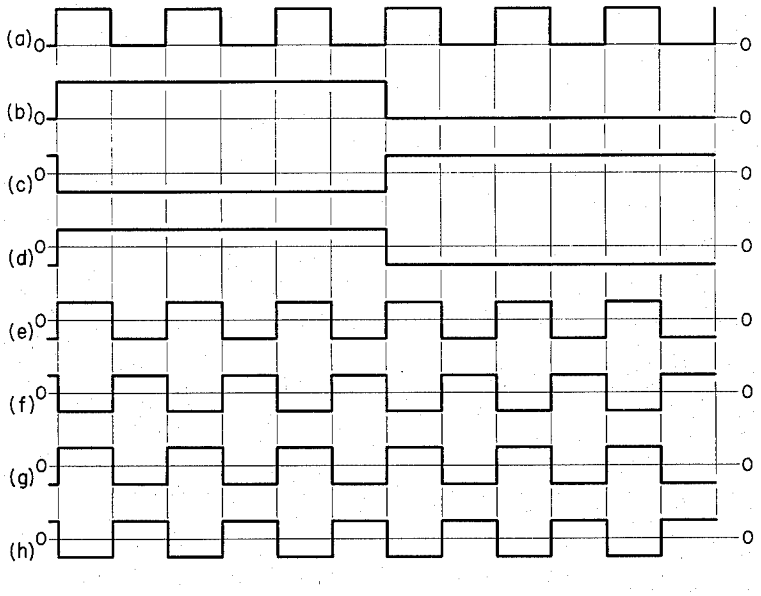
FIGURE 3 is a chart of voltage waveforms represented under a common time base.

The manner in which the multivibrators 10 and 11 and paraphase amplifiers 12 and 13 control the diode coincidence gates 1, 2, 3 and 4, respectively, can be readily seen from an examination of the voltage chart shown in FIG. 3. The pulse forms shown in the chart are all drawn to the same time base and although only a rather small number of pulses is shown in each line, each line is to represent one complete raster. This has been done so as to simplify the explanation of the operation of the system. Line *a* represents the output of one-shot multivibrator 11 and each pulse shown represents the time required for the scan of one-half of the normal video line. Line *b* represents the output of one-shot multivibrator 10 and each pulse represents one-half of the normal vertical scan time. Line *c* represents the output of line 17 of paraphase amplifier 12 and is identical in waveform to line *b* with the exception that it is inverted in polarity. The inverted polarity is due to the paraphase amplifier 12. Line *d* represents the output from line 16 of paraphase amplifier 12 and is identical in waveform and polarity to line *b* which represents the output of the one-shot of the multivibrator 10. Lines *e* and *g* represent the output from line 19 of paraphase amplifier 13. The voltage represented in line *e* is applied to gate number 1 and that in line *g* is applied to gate 3. Lines *f* and *h* represent the output from line 18 of paraphase amplifier 13 which is applied to gates 2 and 4 respectively.

As has already been stated, the coincidence gates 1, 2, 3 and 4 will not pass the incoming video signals unless a positive sync pulse appears at both the horizontal and vertical inputs to the gate. Looking to the table of FIG. 3, it is seen that of lines *c* and *d* only line *d* will present a positive pulse during the first half of the vertical sweep. Thus only gates 1 and 2 may be activated during the first half of the vertical sweep. However, as can be seen from lines *e* and *f* positive pulses will appear at the horizontal input to gates 1 and 2 in an alternate fashion. That is, the positive pulse will appear at gate 1 during the first half of a line and a positive pulse will appear at gate 2 during the second half of a line. In this manner the top half of the video raster will be divided equally between the video signals entering gates 1 and 2. During the second half of the vertical scan the polarity found on line 17 will go positive and the polarity found on line 16 will go negative; thereby gates 1 and 2 will be deactivated for the second half of the vertical scan and gates 3 and 4 may be activated upon proper appearance of a positive signal at the horizontal input thereto. As can be seen from lines *g* and *h* in FIG. 3, the pulses appearing at the horizontal inputs to gates 3 and 4 will alternate in polarity so that during the first half of a line scan the horizontal input to gate 3 will be positive and the horizontal input to gate 4 will be negative and during the second half of a line scan the polarity will reverse. Thus, for the second half of the vertical scan the video applied to gate 3 and video applied to gate 4 will share each line equally as did the videos applied to gates 1 and 2 for the first half of this vertical scan.

It can thus be seen that the diode coincidence gates 1, 2, 3 and 4, respectively, will selectively apply the four video input signals to video amplifier 5 in such a manner that each of the four video signals will occupy its own special designated portion of the video raster. The video signals are amplified by video amplifier 5, passed on to buffer amplifier 7 and are then combined with the input sync signals from amplifier 14. This composite video signal found at the output 15 is then ready to be applied to the standard video receiver.

From the foregoing description of the embodiment illustrated in FIG. 1 it should be evident that the invention consists basically of a system wherein timed switching of four video channels is made possible by properly gating together the normal horizontal and vertical video sync pulses. The embodiment illustrated in connection with FIGURES 4 through 10 will illustrate this basic principle of the invention even more clearly.

Figure 4:
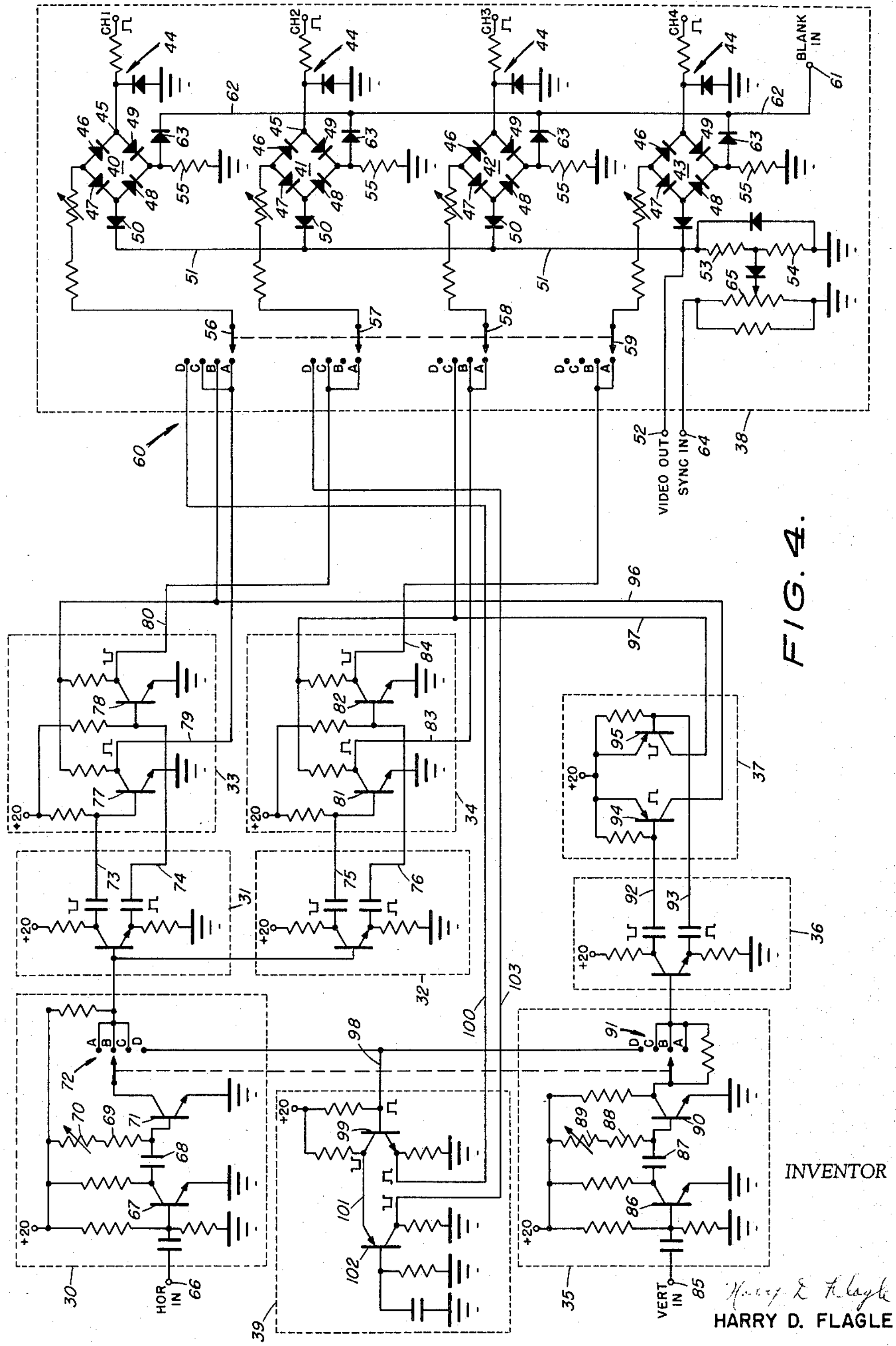
FIGURE 4 is a schematic circuit diagram of a system which comprises a second embodiment of the invention.

Looking to FIGURE 4, the system illustrated therein consists basically of a horizontal channel, a vertical channel and a diode gating circuit. The horizontal channel consists of a special delay amplifier 30, which controls the proportion of each horizontal line relegated to a given video input or pair of video inputs, a pair of phase splitters 31 and 32, which each provide a pair of control signals in response to the output of delay amplifier 30, and a pair of coincidence amplifiers 33 and 34, which provide gating signals in response to control by phase splitters 31 and 32, respectively, and by the outputs from the vertical channel. The vertical channel consists basically of special delay amplifier 35, which controls the proportion of the vertical scan relegated to a given video input or pair of video inputs, a phase splitter 36, which provides a pair of control signals in response to the output of delay amplifier 35, and a gating amplifier 37, wihch provides vertical gating signals that are used to control coincidence amplifiers 33 and 34 as well as to gate incoming video signals. The gating signals generated by the horizontal and vertical channels are applied to a diode gating circuit 38 where the incoming video signals are gated in response thereto. A special control amplifier 39 is also provided in the system. This amplifier combines the control of the horizontal channel and the vertical channel in such a way as to provide control signals which when applied to diode gating circuit 38 will produce a composite video output representing a background-and-insert type pattern.

Looking more closely to FIG. 4, the diode gating circuit 38 consists of four diode gates 40 through 43 to which are applied four possible incoming video channels $CH_1$ through $CH_4$, respectively. Each incoming negative video signal is applied via a resistor and diode combination 44 to a junction point 45 on its respective diode gate. The polarity of the diodes 46 through 49, which comprise each diode gate, is such that the negative incoming video signal which pass diode 46 will be blocked by diodes 47 and 49. The result is that the video signals under these polarity conditions will pass to ground through the diode in combination 44 or will be blocked from output line 51 by diode 47 or 49. However, if a positive gating pulse is applied to any of the diode gates at the junction point between diodes 46 and 47, the diode 44 will be forward biased permitting the negative input video pulse to pass to the diode gate where it will ride on the positive signal through diodes 47, 48, 49 and 50 and will pass to output line 51.

The biasing signals are applied to gates 40 through 43 from switch contacts 56 through 59 on switch 60 via adjustable resistors 61 through 64, respectively. These adjustable resistors provide pedestal level control for each input video channel. The switch 60 is a four pole four position switch having four input terminals A, B, C and D associated with each of the output terminals 56 through 59. The output from each diode gate passes via a diode 50 and output line 51 to output terminal 52. The output line 51 is terminated in a pair of resistors 53 and 54 which upon proper biasing of one of the diode gates is connected in parallel with the gate load resistor 55 for that gate. This parallel combination provides a 75 ohm input impedance which is necessary for proper impedance match of the incoming video channels with the video gate 38.

Provision is made for the insertion of video blanking at terminal 61. The blanking signals are applied to each diode gate via line 62 and rectifiers 63. Provision is also made for insertion of horizontal and vertical sync pulses into the composite output signal. Sync pulses are applied at terminal 64 to a potentiometer 65 which provides level control. These pulses are then added to the output signal through resistor 53.

From the foregoing description of the diode gating circuit 38 it should be obvious that an input signal on any channel will be applied to the output 52 whenever a a positive gating signal is applied to the diode gate associated with that particular channel. The manner in which these positive gating signals are generated will now be explained.

Horizontal sync pulses are applied to special delay amplifier 30 at terminal 66. Transistor stage 67 amplifies the incoming signal and applies it to a differentiating circuit consisting of capacitor 68 and resistors 69 and 70. This differentiating circuit converts the incoming waveform to a sawtooth type waveform, which depending upon the bias on transistor 71 to which it is applied, will saturate transistor 71 at some time during the applied pulse. The result is a square wave output from transistor 71 which varies in duration according to the bias set by variable resistance 70. Thus, if variable resistance 70 sets the bias on transistor 71 such that the transistor will fire at the mid-point of the incoming pulse, the output of transistor 71 will be a square wave whose duration is one-half the time of one conventional horizontal video line scan.

The output from transistor 71 is applied to a single pole four position switch 72 having output terminals A, B, C and D which correspond to the terminals having the same designation on switch 60. The output on terminals A, B, and C is applied on the one hand to phase splitter 31, of conventional design, which produces a pair of oppositely poled square wave signals on lines 73 and 74, and on the other hand this output is applied to phase splitter 32 which produces a similar pair of square wave signals on lines 75 and 76. The signals on lines 73 and 74 are applied to the bases of transistors 77 and 78, respectively, in coincidence amplifier 33. Transistors 77 and 78 are rendered alternately conductive by these oppositely poled signals from phase splitter 31 and they thus will produce output signals on lines 79 and 80 such as shown in lines *e* and *f*, respectively, of FIG. 3. In a like manner, the signals on lines 75 and 76 in phase splitter 32 are applied to the bases of transistors 81 and 82, respectively, in coincidence amplifier 34 and they render these transistors alternately conductive producing signals on output lines 83 and 84 such as shown in lines *g* and *h*, respectively, of FIG. 3. However, it should be noticed that the collectors of transistors 77, 78, 81 and 82 are not connected to a source of voltage, and until they are, there will be no output from these stages. The manner in which this voltage is applied and reasons therefor will be explained below.

Vertical sync pulses are applied at terminal 85 to delay amplifier 35 which is identical in both configuration and operation to amplifier 30. The vertical sync signal is amplified by transistor 86, shaped by the differentiating circuit consisting of capacitor 87 and resistors 88 and 89, and applied in control of transistor 90. In the same manner as described in connection with amplifier 30, the duration of the square wave output pulse from transistor 90 can be adjusted through proper setting of variable resistor 89 to any fraction or all of the time of one conventional vertical video sweep. This output is applied to single pole four position switch 91 having four output terminals A, B, C and D which correspond to the terminals having the same designation on switches 60 and 72.

The output at terminals A, B and C is applied to phase splitter 36, of conventional design, which produces a pair of oppositely poled square wave signals on lines 92 and 93. The signals are applied to transistors 94 and 95 in gating amplifier 37 such that these transistors are rendered alternately conductive producing an output on line 96 such as shown in line *d* of FIG. 3 and an output on line alternately conductive producing an output on line 96 from transistor 94 is connected to the collector circuits of transistors 77 and 78 so that while transistor 94 is conducting transistors 77 and 78 will be connected to a source of voltage and therefore may conduct during that period. In a like manner, output line 97 from transistor 95 is connected to the collector circuits of transistors 81 and 82 so that while transistor 95 is conducting transistors 81 and 82 will be connected to a source of voltage and they may conduct during that period. It is thus seen that coincidence amplifiers 33 and 34 which contain horizontal gating pulses are switched on and off alternately at a vertical rate.

The outputs D on switches 72 and 91 are connected together and output D on switch 72 is also applied via line 98 to transistor 99 in special control amplifier 39. Transistor 99 is connected as a phase splitter providing a positive output pulse on line 100 when a positive pulse appears on line 98. Transistor 99 also provides a pulse output on line 101 which is positive whenever the input to transistor 99 on line 98 is zero. The pulse output on line 101 is passed through grounded base amplifier 102 so as to restore its D.C. level and is then applied to output line 103.

FIGURES 5 through 10 illustrate some of the video patterns which can be generated by the system of FIG. 4, and so, the operation of the system of FIG. 4 will be explained in conjunction with these patterns.

Figure 5:
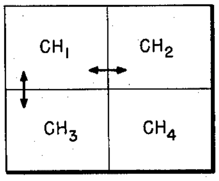
FIGURES 5 through 10 illustrate some of the possible video patterns available through use of the embodiment of the invention shown in FIGURE 4.

The basic pattern generated by the system of FIG. 4 is the pattern illustrated in FIG. 5. This is the same pattern which is generated by the embodiment of the invention illustrated in FIG. 1 and is the fundamental pattern produced by the invention. The four pictures produced are derived from the application of different video signals to the four video inputs $CH_1$ through $CH_4$ on diode gating circuit 38. The switches 60, 72 and 91 are set to the A position so that diode gate 40 is connected to the output line 79 of transistor 77, diode gate 41 is connected to output line 80 of transistor 78, diode gate 42 is connected to output line 83 of transistor 81, and diode gate 43 is connected to output line 84 of transistor 82. With variable resistors 70 and 89 set to saturate transistors 71 and 90, for one-half of the horizontal and vertical sync periods, respectively, transistors 77 and 81 in amplifiers 33 and 34 will be properly triggered for positive conduction during the left half of each horizontal scan and transistors 78 and 82 will be properly triggered for positive conduction during the right half of each horizontal scan. However, since amplifiers 33 and 34 are rendered alternately conductive by the vertical output pulses on lines 96 and 97, respectively, transistor 77 will have a positive pulse output during the first quarter of scan, transistor 78 will have a positive pulse output during the second quarter of scan, transistor 81 will have a positive pulse output during the third quarter of scan and transistor 82 will have positive pulse output during the fourth quarter of scan. These four positive signals are applied to the diode gates via switch 60 in this order thereby connecting the four video channels $CH_1$ through $CH_4$ to output terminal 52 in consecutive order producing a video picture as shown in FIG. 5.

Figure 6:
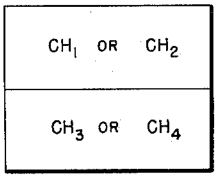
Figure 7:
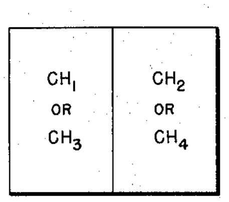

The picture depicted by the pattern of FIG. 6 is easily produced since it is a version of the pattern of FIG. 5. This pattern is produced with switches 60, 72 and 91 in the A position by adjusting variable resistor 70 such that transistor 71 saturates for all of or none of the horizontal sync period. In that way only transistors 77 and 81 or only transistors 78 and 82 will provide a positive output during an entire raster period. Thus channels $CH_1$ and $CH_3$ or channels $CH_2$ and $CH_4$ will be combined to provide distinct pictures on the upper and lower halves of the raster. In other words the vertical line in the pattern of FIG. 5 can be wiped in either direction. The picture depicted by the pattern of FIG. 7 is produced in a similar manner by adjusting variable resistor 89 so that only transistor 94 or transistor 95 will produce a positive output during a complete raster period. In this way only amplifier 33 or amplifier 34 will control diode gating circuit 38 during the entire period. Thus, the horizontal line in the pattern of FIG. 5 can also be wiped in either direction.

Figure 8:
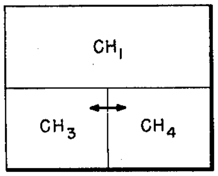
Figure 9:
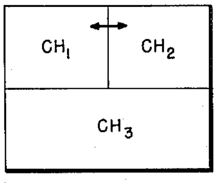

The picture depicted by the pattern of FIG. 8 is produced by setting switches 60, 72 and 91 to the B position. Diode gate 40 thus receives a positive gating pulse from vertical sync output line 96 during the entire upper half of the raster. During the lower half of the raster, diode gates 42 and 43 are alternately gated by coincidence amplifier 34. The picture depicted by the pattern of FIG. 9 is produced in a manner similar to that just described. With switches 60, 72, and 91 set to position C, diode gates 40 and 41 will be gated alternately by coincidence amplifier 33 for the first half of the raster and diode gate 42 will be gated for the entire last half of the raster by the vertical sync output from line 97.

Figure 10:
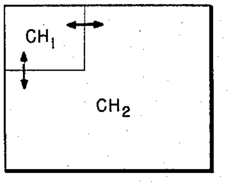

The insert type pattern shown in FIG. 10 is derived by setting switches 60, 72, and 91 to the D position. With switch 72 in the D position the collector of transistor 71 is connected to the collector of transistor 90 in delay amplifier 35 rather than source voltage as in the other switch positions. As a result transistor 71 will conduct only when transistor 90 is conducting, resulting in a coincidence type arrangement between delay amplifiers 30 and 35. If variable resistor 89 is set for a period of half of a scan, delay amplifier 35 can conduct for only the first half of scan. If, in turn, variable resistor 70 is set for a period of half of a scan, delay amplifier 30 will conduct for only the first quarter of scan. The result is that the input to transistor 99 will be a positive signal for the first quarter of scan producing a positive output on line 100 which gates diode gate 40 applying $CH_1$ to the first quarter of the raster. During the other three quarters of scan delay amplifier 30 is gated off either because of its own bias setting or because of the non-conduction of transistor 90. During this period there will be no input to transistor 99 and so transistor 102 will provide a positive pulse to line 103 gating diode gate 41 and applying $CH_2$ to the second, third and fourth quarters of the raster. It can thus be seen that the size of the insert depends on the settings of resistors 70 and 89 and that the insert could be increased in size to include the entire raster or decreased in size until it is eliminated.

It should be obvious at this point that any of the dividing lines shown on the patterns of FIGS. 5 through 10 can be wiped in either direction by controls 70 and 89. The pedestal level for each of the video input channels can also be controlled by variable resistors 61 to 64. Thus, the invention provides a system which permits almost complete control of the application of as many as four separate video channels to one video raster in almost any proportion. In addition the invention makes such control possible through very inexpensive, compact means.

The diode gating circuit 38 controls the application of input video channels $CH_1$ through $CH_4$ to the output 52 according to the program set by switches 60, 72, and 91 and the setting of variable resistors 70 and 89. However, this gating circuit 38 could be programmed by other special effects equipment to produce a wide variety of configurations on a cathode ray tube. This can be accomplished quite simply by applying the proper positive gating signals to switch contacts 56 through 59 on switch 60 via a set of special input terminals to which the special effects equipment could be connected. An additional modification can be made to the system of FIG. 4 by providing a second special delay amplifier similar to amplifier 30 for controlling the operation of phase splitter 32 and coincidence amplifier 34 independent of the control provided by amplifier 30 for phase splitter 31 and coincidence amplifier 33. In this way the vertical lines in the upper and lower halves of the raster could be wiped independently of each other.

These and other modifications and variations of the pesent invention are possible in the light of the above teachings. It is therefore to be understood that within the scope of the appended claims the invention may be practiced otherwise than as specifically described.

What is claimed is:

1. A video integrating system comprising a plurality of input signal sources, an output circuit, diode coincidence gating means connected to said input signal sources and said output circuit for selectively connecting said input signal sources to said output circuit in response to coincident gating signals, a source of horizontal and vertical video sync signals, a sync separator connected to said source of sync signals, first and second multivibrators connected to the horizontal and vertical outputs of said sync separator, respectively, and means connected to said first and second multivibrators and said diode coincidence gating means having a plurality of outputs for activating said gating means only upon coincidence of positive signals at two of said outputs of said activating means so that said diode gating means is energized in a programmed manner according to the timing of said sync signals.

2. A video integrating system comprising a plurality of input signal sources, an output circuit, diode coincidence gating means connected to said input signal sources and said output circuit for selectively connecting said signal sources to said output circuit in response to coincident gating signals, sources of horizontal and vertical video sync signals, a first multivibrator connected to said source of horizontal sync signals and controlled thereby, a second multivibrator connected to said source of vertical sync pulses and controlled thereby, and first and second paraphase amplifiers connected to said first and second multivibrators, respectively, said paraphase amplifiers each having a pair of outputs connected to said diode coincident gating means such that said gating means is activated by coincident signals from said paraphase amplifiers so as to connect said signal sources to said output circuit in a predetermined order.

3. A video integrating system comprising a plurality of input signal sources, an output circuit, diode gating means connected to said input signal sources and said output circuit for selectively connecting said input signal sources to said output circuit in response to programmed gating signals, sources of horizontal and vertical video sync signals, coincidence means connected to said source of horizontal sync signals for generating a plurality of controlled gating signals in response to said horizontal sync signals, control means connected to said source of vertical sync signals for controlling the operation of said coincidence means according to preset conditions, and means for connecting said controlled gating signals to said diode gating means in control thereof so that said signal sources are applied to said output circuit according to a preset sequence.

4. A video integrating system comprising a plurality of input signal sources, an output circuit, diode gating means connected to said input signal sources and said output circuit for selectively connecting said input signal sources to said output circuit in response to programmed gating signals, a source of horizontal and vertical video sync signals, first control means connected to said source of sync signals for producing a first positive square wave signal whose duration is equal to a portion of the time between horizontal sync pulses and second control means for producing a second positive square wave signal whose duration is equal to a portion of the time between vertical sync pulses, first and second pairs of coincidence amplifiers connected to said first and second control means, respectively, such that each of said amplifiers is gated to conduction by the first positive square wave pulse whenever the second positive square wave pulse is applied thereto in coincidence, the outputs of said amplifiers being connected to said diode gating means in control thereof so that said diode gating means is energized in a programmed manner according to the timing of said sync signals.

5. A video integrating system as defined in claim 4 wherein said first and second control means for producing positive square wave signals each comprises an input amplifier, a differentiating circuit connected to the output of said input amplifier, an output amplifier having its input connected to the output of said differentiating circuit such that control of the time of saturation of said second amplifier may be effected by adjustment of said differentiating circuit thereby producing a square output wave whose time duration varies according to the time constant of said differentiating circuit.

6. A video integrating system comprising a plurality of input signal sources, an output circuit, diode gating means connected to said input signal sources and said output circuit for selectively connecting said input signal sources to said output circuit in response to programmed gating signals, a source of horizontal and vertical sync signals, first control means connected to said source of sync signals for producing a first positive square wave signal whose duration is equal to a portion of the time between horizontal sync pulses and second control means connected to said source of sync signals for producing a second positive square wave signal whose duration is equal to a portion of the time between vertical sync pulses, said second control means being connected to said first control means such that said first control means produces a positive output only when said second control means produces a positive output, and special control means connected to the output of said first control means and said diode gating means for connecting one of said plurality of input signal sources to said output circuit whenever said first control means produces a positive output and for connecting another of said plurality of input signal sources to said output circuit whenever said first control means is inactive.

7. A video integrating system as defined in claim 6 wherein said first and second control means for producing positive square wave signals each comprises an input amplifier, a differentiating circuit connected to the output of said input amplifier, an output amplifier having its input connected to the output of said differentiating circuit such that control of the time of saturation of said second amplifier may be effected by adjustment of said differentiating circuit thereby producing a square output wave whose time duration varies according to the time constant of said differentiating circuit.

8. A video integrating system comprising a pair of diode gates, a pair of different video signals, each connected to one of said diode gates, an output circuit connected to each of said diode gates for receiving one of said video signals upon application of a gating pulse to the corresponding diode gate, a source of horizontal video sync signals and a source of vertical video sync signals, a first differentiating circuit connected to said source of horizontal sync signals and a second differentiating circuit connected to said source of vertical sync signals, first and second input transistor amplifiers having adjustable bias connected to said first and second differentiating circuits, respectively, said amplifiers providing a positive square wave output whose duration is some portion of the time between input pulses to the differentiating circuits depending upon the bias set on said amplifiers, said second amplifier being connected to said first amplifier in control thereof such that said first amplifier produces a positive output only when said second amplifier produces a positive output, a phase splitting circuit connected to said first amplifier so as to generate a pair of gating signals, and means to apply said pair of gating signals to said pair of diode gates such that one of said diode gates will be activated when said first input amplifier generates a positive output and the other of said diode gates will be activated when said first amplifier is cut off.

9. A video integrating system comprising a plurality of diode gates, a plurality of different video signals, each connected to one of said diode gates, an output circuit connected to each of said diode gates for receiving one of said video signals upon application of a gating pulse to the corresponding diode gate, a source of horizontal video sync signals and a source of vertical video sync signals, a first differentiating circuit connected to said source of horizontal sync signals and a second differentiating circuit connected to said source of vertical sync signals, first and second input transistor amplifiers having adjustable bias connected to said first and second differentiating circuits, respectively, said amplifiers providing a positive square wave output whose duration is some portion of the time between input pulses to the differentiating circuits depending upon the bias set on said amplifiers, first and second phase splitting circuits connected to said first input amplifier and a third phase splitting circuit connected to said second input amplifier, a gating amplifier connected to said third phase splitting circuit so as to generate a pair of gating signals, first and second coincidence amplifiers connected to said first and second phase splitting circuits and to said gating amplifier such that said coincidence amplifiers generate gating signals whenever inputs are received from said first and second phase splitting circuits and from said gating amplifier in coincidence, and means for applying the output gating signals from said coincidence amplifiers and said gating amplifier to said diode gates in control thereof so that said input video signals will be applied to said output circuit in a predetermined, controlled manner.

References Cited by the Examiner

UNITED STATES PATENTS

| | | | |
|---|---|---|---|
| 2,164,297 | 6/39 | Bedford | 178—6 |
| 2,809,298 | 10/57 | Cawein | 178—6 |

FOREIGN PATENTS

| | | |
|---|---|---|
| 1,009,228 | 5/57 | Germany. |

OTHER REFERENCES

"Video Switching for TV Broadcast Centers," by E. B. Pores, Electronics, December 1956; pp. 146–149.

DAVID G. REDINBAUGH, *Primary Examiner.*